(12) United States Patent
Kim et al.

(10) Patent No.: US 11,521,093 B2
(45) Date of Patent: Dec. 6, 2022

(54) ARTIFICIAL INTELLIGENCE APPARATUS FOR PERFORMING SELF DIAGNOSIS AND METHOD FOR THE SAME

(71) Applicant: LG ELECTRONICS INC., Seoul (KR)

(72) Inventors: Jaehong Kim, Seoul (KR); Heeyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 589 days.

(21) Appl. No.: 16/541,740

(22) Filed: Aug. 15, 2019

(65) Prior Publication Data

US 2019/0370674 A1    Dec. 5, 2019

(30) Foreign Application Priority Data

Jul. 15, 2019    (KR) .......................... 10-2019-0085180

(51) Int. Cl.
| | |
|---|---|
| *G06N 5/04* | (2006.01) |
| *G06K 19/07* | (2006.01) |
| *G06N 3/08* | (2006.01) |
| *G06N 3/04* | (2006.01) |

(52) U.S. Cl.
CPC ......... *G06N 5/045* (2013.01); *G06K 19/0719* (2013.01); *G06N 3/04* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 2010/0319434 A1* | 12/2010 | Weber ................. | G11B 19/042 73/12.06 |
| 2012/0157073 A1 | 6/2012 | Kim et al. | |
| 2014/0024348 A1 | 1/2014 | Hurst et al. | |
| 2016/0054354 A1* | 2/2016 | Keal ....................... | G01P 15/16 702/141 |
| 2016/0343083 A1* | 11/2016 | Hering .................... | G06F 21/50 |
| 2017/0372585 A1* | 12/2017 | Iv Evangelista .... | G01P 15/0891 |
| 2018/0181860 A1* | 6/2018 | Verbist ................. | G06N 3/0445 |
| 2018/0342050 A1* | 11/2018 | Fitzgerald ............. | G06T 7/0004 |
| 2019/0268461 A1* | 8/2019 | Ai ....................... | H04M 1/72454 |
| 2020/0103434 A1* | 4/2020 | Porano ................. | A61B 6/4283 |

FOREIGN PATENT DOCUMENTS

| | | |
|---|---|---|
| JP | 2018-78616 A | 5/2018 |
| KR | 10-2012-0070420 A | 6/2012 |

* cited by examiner

*Primary Examiner* — Alan Chen
(74) *Attorney, Agent, or Firm* — Birch, Stewart, Kolasch & Birch, LLP

(57) ABSTRACT

Disclosed is an artificial intelligence apparatus that includes: a sensing unit that includes a gyroscope sensor and an acceleration sensor; an output unit that outputs information; and a processor that acquires a resultant value output from a deep learning model by inputting data acquired from the gyroscope sensor and the acceleration sensor into the deep learning model, performs self-diagnosis when the resultant value shows a shock requiring self-diagnosis, and controls the output unit to output a result of the self diagnosis, in which the deep learning model is a neural network having an adjusted weight by being trained using whether a shock is a shock requiring the self-diagnosis as a resultant value and sensing values of the gyroscope sensor and the acceleration sensor as input values.

7 Claims, 9 Drawing Sheets

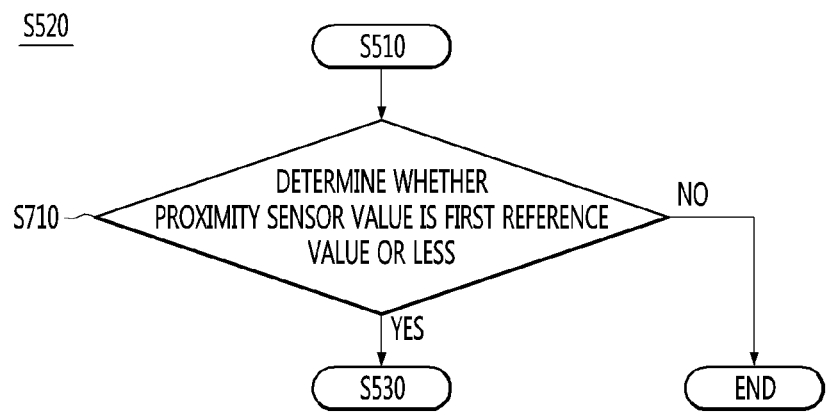
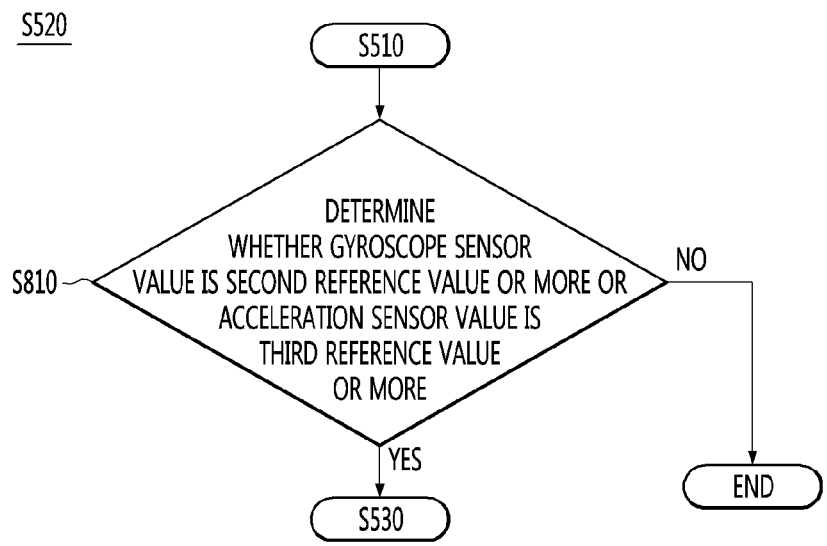

ARTIFICIAL INTELLIGENCE APPARATUS FOR PERFORMING SELF DIAGNOSIS AND METHOD FOR THE SAME

CROSS REFERENCE TO RELATED APPLICATION

The present application claims priority to Korean Patent Application No. 10-2019-0085180, filed on Jul. 15, 2019 in the Republic of Korea, the entire contents of which are hereby expressly incorporated by reference into the present application.

BACKGROUND OF THE INVENTION

Field of the Invention

The present invention relates to an artificial intelligence apparatus that determines that a shock is a shock requiring self-diagnosis using gyroscope sensor, acceleration sensor, and proximity sensor values when a shock requiring self-diagnosis is generated, and performs self-diagnosis when determining that the shock is a shock requiring self-diagnosis.

Description of the Related Art

In general, when diagnosing abnormality of parts of an artificial intelligence apparatus, a user performs diagnosis by manually executing an abnormality diagnosis program or application, and when there is an abnormal part as the result of diagnosis, repair is made in a way the user requests repair to a service center in person. In general, a shock requiring self-diagnosis corresponds to a main reason of breakage of parts of an artificial intelligence apparatus. Further, even if there is a shock requiring self-diagnosis, a user cannot immediately recognize an abnormal internal part in an artificial intelligence apparatus that looks not having a defect as seen from the outside. Accordingly, in this case, the user visits a service center late, so the defect of the part get severe.

Recently, smart devices are provided with self-diagnosis programs or applications, but they are not frequently used, and accordingly, it is impossible to sense part defects in real time. Therefore, there is a need for a method that can inform a user whether parts have abnormality by performing self-diagnosis in real time when a shock requiring self-diagnosis is generated, using main sensors mounted on smart devices.

SUMMARY OF THE INVENTION

The present invention relates to an artificial intelligence apparatus that determines that a shock is a shock requiring self-diagnosis using gyroscope sensor, acceleration sensor, and proximity sensor values when a shock requiring self-diagnosis is generated, and performs self-diagnosis when determining that the shock is a shock requiring self-diagnosis, and a method for the same.

An artificial intelligence apparatus according to an embodiment includes: a sensing unit that includes a gyroscope sensor and an acceleration sensor; an output unit that outputs information; and a processor that acquires a resultant value output from a deep learning model by inputting data acquired from the gyroscope sensor and the acceleration sensor into the deep learning model, performs self-diagnosis when the resultant value shows a shock requiring self-diagnosis, and controls the output unit to output a result of the self diagnosis, in which the deep learning model is a neural network having an adjusted weight by being trained using whether a shock is a shock requiring the self-diagnosis as a resultant value and sensing values of the gyroscope sensor and the acceleration sensor as input values.

The deep learning model may output the resultant value that shows whether a shock is a shock requiring self-diagnosis or a simple shock using data acquired from the sensing unit.

The sensing unit may further include a proximity sensor, and the processor may input data acquired from the gyroscope sensor, the acceleration sensor, and the proximity sensor, and may acquire the resultant value that the deep learning model outputs using the data acquired from the gyroscope sensor, the acceleration sensor, and the proximity sensor.

The processor may input the data acquired from the gyroscope sensor, the acceleration sensor, and the proximity sensor when the proximity sensor value is a first reference value or less.

When the value of the proximity sensor is the first reference value or less and the gyroscope sensor value is a second reference value or more, or when the value of the proximity sensor is the first reference value or less and the acceleration sensor value is a third reference value or more, the processor may input data acquired from the gyroscope sensor, the acceleration sensor, and the proximity sensor into the deep learning model.

When the gyroscope sensor value is a second reference value or more and the acceleration sensor value is a third reference value or more, the processor may input data acquired from the gyroscope sensor and the acceleration sensor, and the deep learning model may output the resultant value using the data acquired from the gyroscope sensor and the acceleration sensor.

The sensing unit may further include a proximity sensor, and when the value of the proximity sensor is the first reference value or less and the gyroscope sensor value is a second reference value or more, or when the value of the proximity sensor is the first reference value or less and the acceleration sensor value is a third reference value or more, the processor may input data acquired from the gyroscope sensor and the acceleration sensor into the deep learning model.

When the resultant value output by the deep learning model shows that a shock requiring diagnosis, the processor may estimate a drop angle in a collision using the gyroscope sensor value and may perform self-diagnosis on parts in high priority order in accordance with the estimated angle.

The high priority order may be an order of parts closer to a collision point in a collision.

When the self-diagnosis result is abnormality or warning, the processor may provide abnormality diagnosis information of a corresponding part to a service center.

According to an embodiment, when an artificial intelligence apparatus such as a mobile device that a user uses while moving such as a smartphone, a tablet, etc. drops and a shock is generated, the artificial intelligence apparatus itself performs self-diagnosis and gives a warning even if the user performs self-diagnosis through a specific self-diagnosis application or a service center. Accordingly, convenience can be provided for the user. Further, since the artificial intelligence apparatus determines that a resultant value of a deep learning model is a shock requiring self-diagnosis, it determines by itself whether it is intentional drop or shock or an unexpected shock requiring self-diagnosis, and then gives a self-diagnosis priority in order of parts closer to the shock position. Accordingly, there is an advantage that reliability and accuracy of a system are secured.

BRIEF DESCRIPTION OF THE DRAWINGS

FIG. 7 is a diagram showing that a proximity sensor value according to an embodiment of the present invention becomes an input of a deep learning model when the value is a first reference value or less.

FIG. 8 is a diagram showing that a gyroscope sensor value or an acceleration sensor value according to an embodiment of the present invention becomes an input of a deep learning model when the gyroscope sensor value is a second reference value or more or the acceleration sensor value is a third reference value or more.

DETAILED DESCRIPTION OF THE INVENTION

Figure 1:
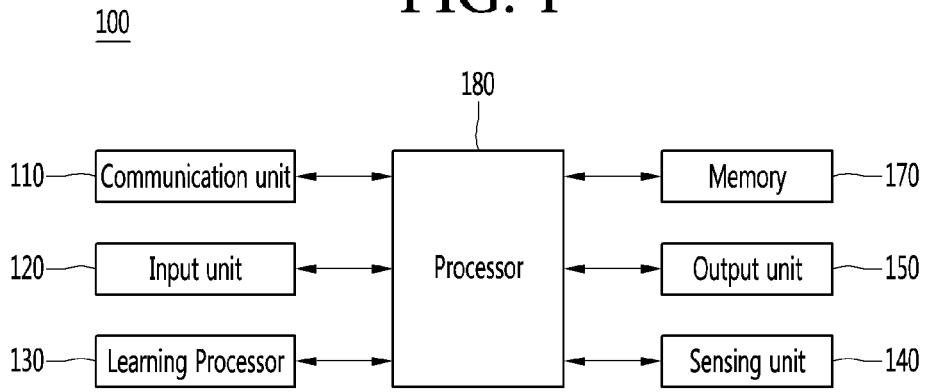
FIG. 1 illustrates an AI device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
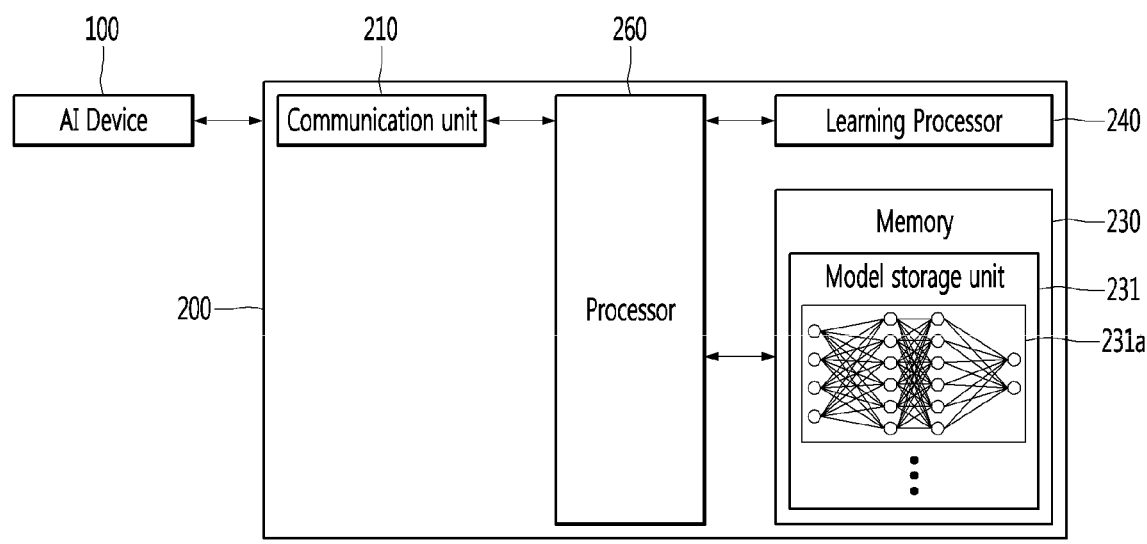
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
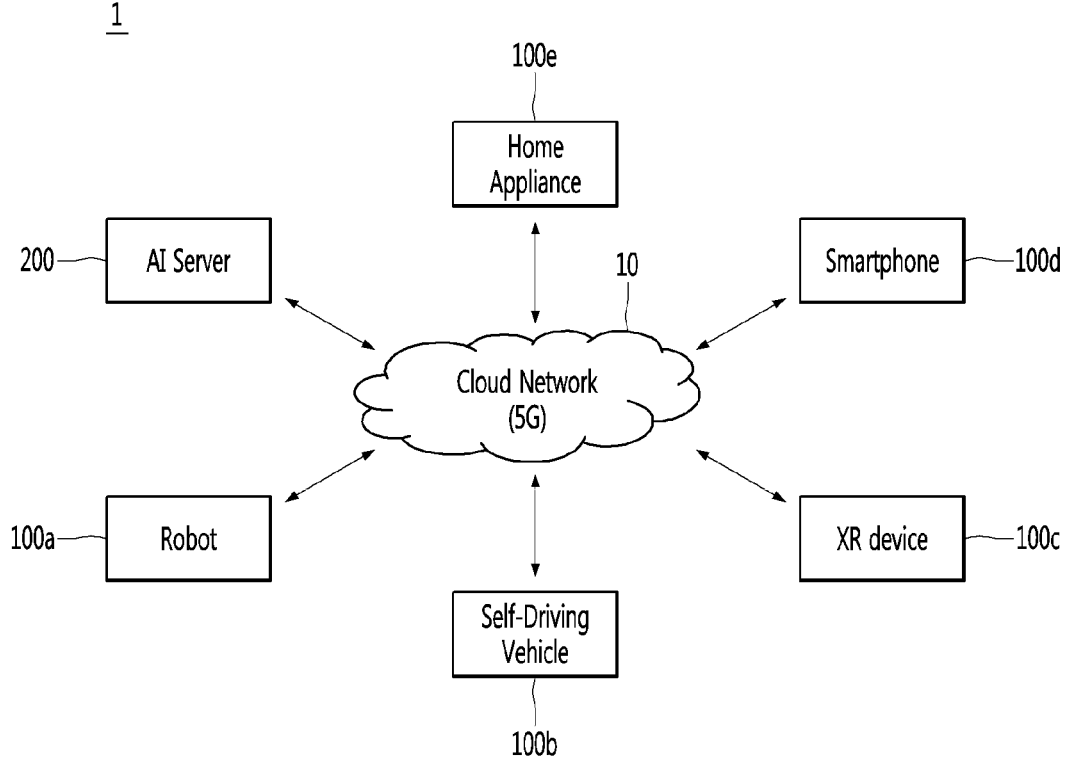
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
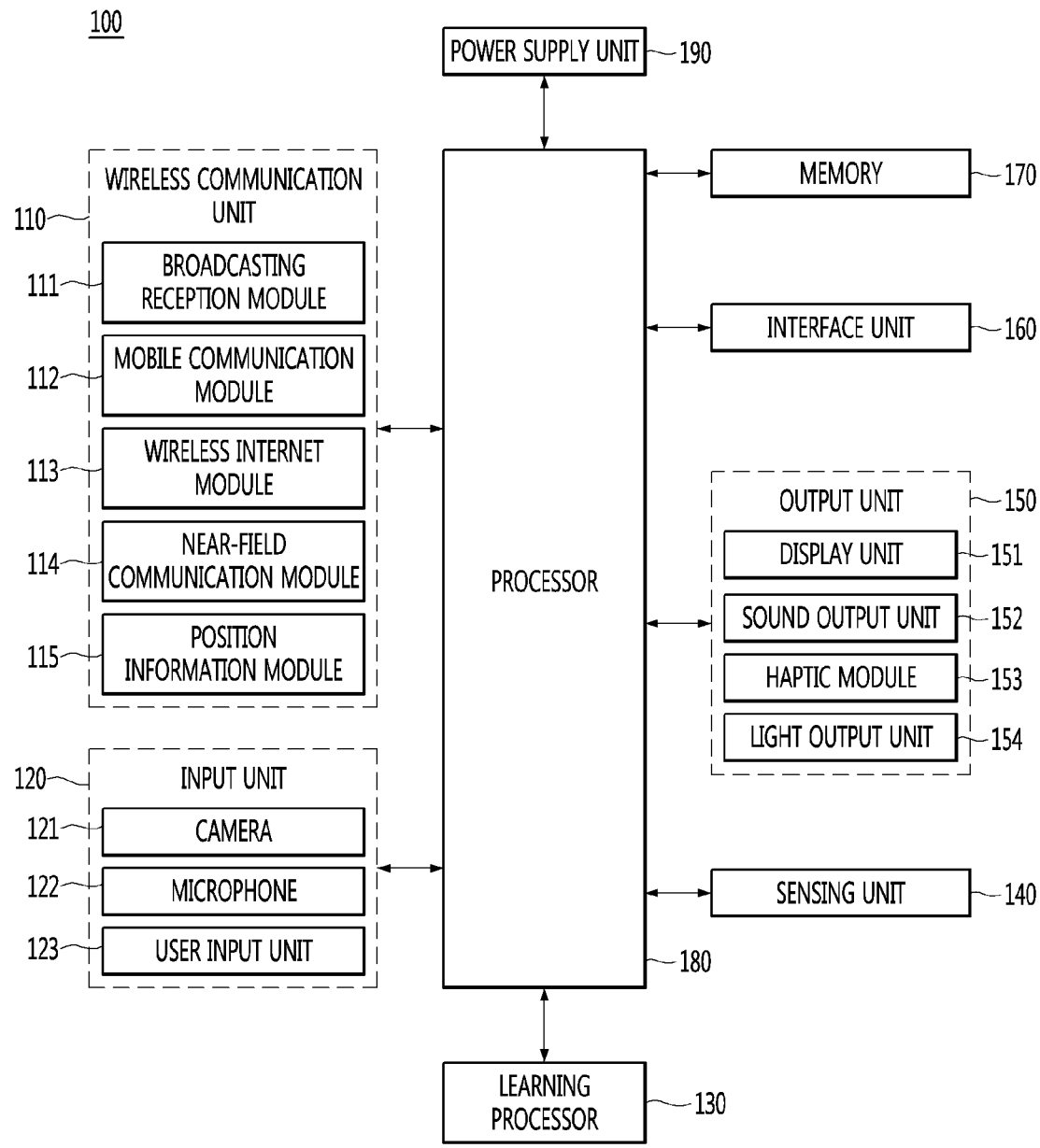
FIG. 4 is a block diagram showing the configuration of an artificial intelligence apparatus 100 according to an embodiment of the present invention.

FIG. 4 is a block diagram showing the configuration of an artificial intelligence apparatus 100 according to an embodiment of the present invention.

Repeated description to FIG. 1 is omitted.

Hereafter, the artificial intelligence apparatus 100 may be referred to as a terminal.

The sensing unit 140 may include at least one or more sensors for sensing at least one of information in a mobile artificial intelligence apparatus, surrounding environment information around the mobile artificial intelligence apparatus, and user information. For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera (see 121)), a microphone (see 122), a battery gauge, an environmental sensor (e.g., a barometer, a hygrometer, a thermometer, a radioactivity sensor, a thermal sensor, and a gas sensor), and a chemical sensor (e.g., an electronic nose, a healthcare sensor, and a biological sensor). Meanwhile, the artificial intelligence apparatus disclosed in this specification may use combinations of items of information sensed by at least two or more sensors these sensors.

The sensing unit 140 may include various sensors. In detail, a sensor means a device that senses specific information from a measurement target and converts the information into an electrical signal. The sensing unit 140 may include an acceleration sensor, a gyroscope sensor, and a proximity sensor. The proximity sensor is a non-contact type detection sensor that determines whether there is a target object when the target object approaches close and the acceleration sensor is a sensor detecting a change of a target speed per unit time and senses dynamic force such as acceleration, vibration, and shock. The gyroscope sensor is a sensor usually sensing a rotational angle by detecting the inertia of an object as an electrical signal and can sense a height, rotation, an inclination, etc., thereby enabling precise motion sensing.

The output unit 150, which is for generating output related to the sense of sight, the sense of hearing, or the sense of touch, may include at least one of a display unit 151, a sound output unit 152, a haptic module 153, and a light output unit 154.

The display unit 151 displays (outputs) information that is processed by the artificial intelligence apparatus 100. For example, the display unit 151 can display execution image information of applications that are driven in the artificial intelligence apparatus 100 or UI (User Interface) and GUI (Graphic User Interface) information according to this execution image information.

The display unit 151 forms a mutual layer structure with the touch sensor or is formed integrally with the touch sensor, thereby being able to implement a touch screen. Such a touch screen can function as a user input unit 123 that provides an input interface between the artificial intelligence apparatus 100 and a user and can provide an output interface between the artificial intelligence apparatus 100 and the user.

The sound output unit 152 can output audio data received from the wireless communication unit 111 or stored in the memory 170 in call signal reception, a calling mode or a recording mode, a voice recognition mode, a broadcasting reception mode, etc.

Figure 5:
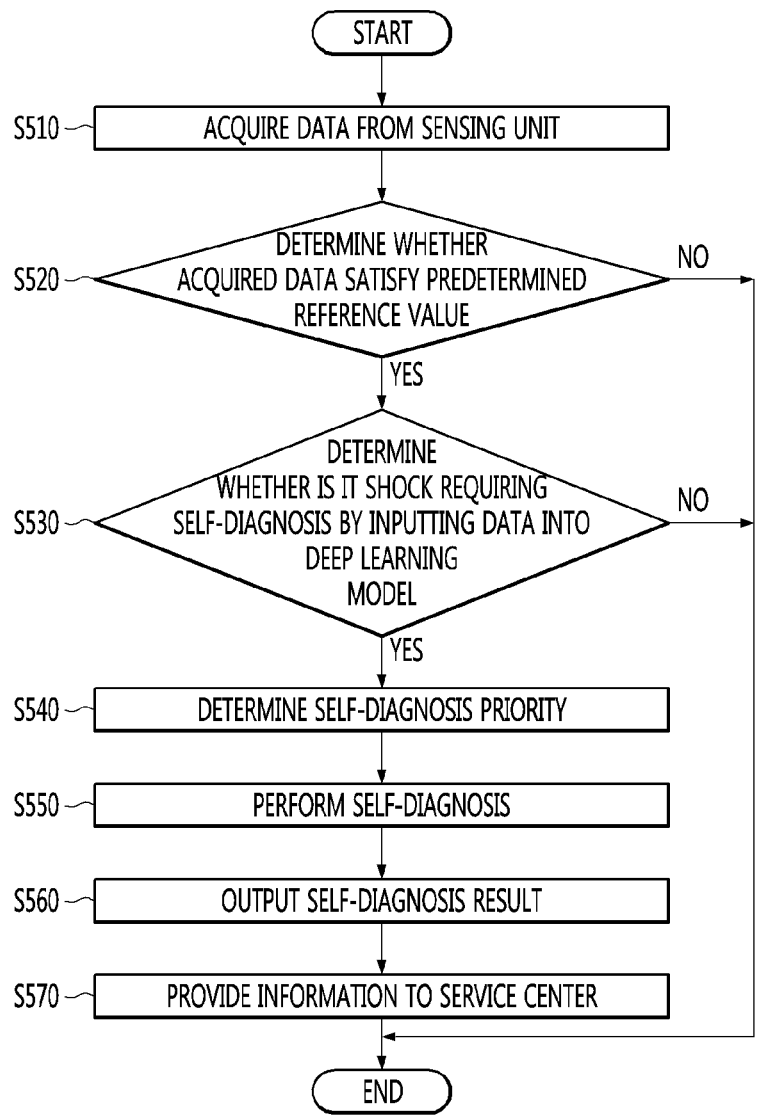
FIG. 5 is a flowchart showing an operation sequence of an artificial intelligence apparatus according to an embodiment of the present invention.

FIG. 5 is a flowchart showing an operation sequence of an artificial intelligence apparatus according to an embodiment of the present invention.

The operation sequence of an artificial intelligence apparatus according to an embodiment of the present invention may include: acquiring data through the sensing unit 140 (S510); determining whether the data acquired by the processor 180 satisfy a predetermined reference value (S520); determining whether it is a shock requiring self-diagnosis by inserting data into a deep learning model (S530); setting a self-diagnosis priority (S540); performing self-diagnosis (S550); outputting a self-diagnosis result (S560); and providing information to a service center (S570).

The acquiring data through the sensing unit 140 (S510) is described first.

The sensing unit 140 acquires data from the relationship with a sensing target object (S510). In detail, the data may include a proximity sensor value obtained from a proximity sensor, an acceleration sensor value obtained from an acceleration sensor, and a gyroscope sensor value obtained from a gyroscope sensor.

The processor 180 determines whether data acquired by receiving or sensing the data acquired through the sensing unit 140 satisfy a predetermined reference value (S520).

It is inefficient to input all the data acquired through the sensing unit 140 into a deep learning model. Accordingly, the processor 180 does not immediately use the data acquired through the sensing unit 140 as input values of the deep learning model and may primarily determine whether to use the data as input values of the deep learning model by setting a predetermined reference value for each sensor and comparing sensor values with the reference values. This is described in detail hereafter with reference to FIGS. 6 to 8.

Figure 6:
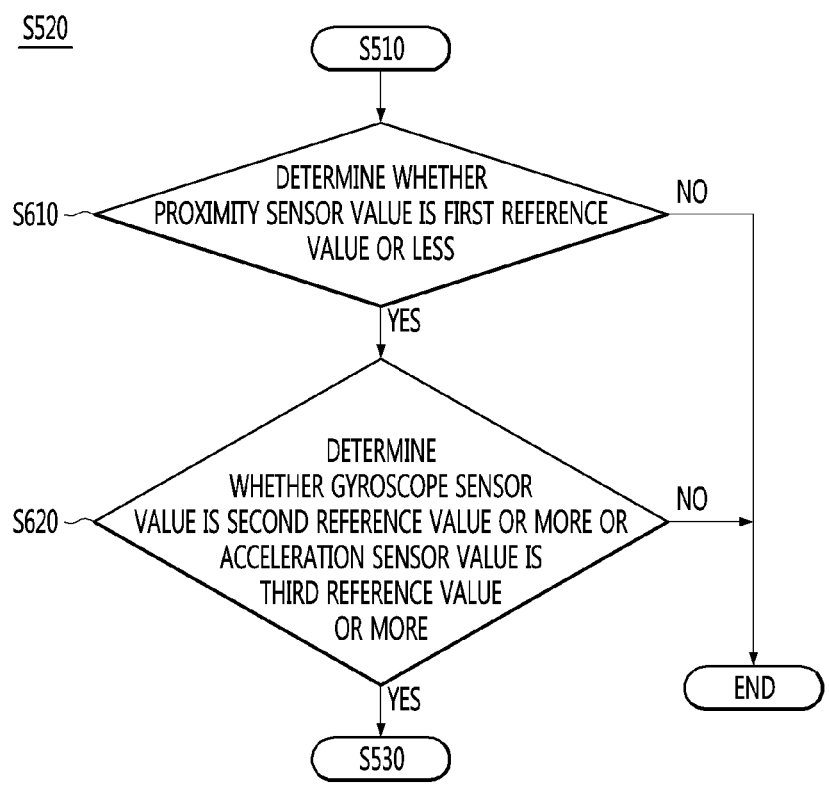
FIG. 6 is a flowchart showing that a proximity sensor value, a gyroscope sensor value, and an acceleration sensor value according to an embodiment of the present invention become input values of a deep learning model when the values satisfy predetermined reference values.

FIG. 6 is a flowchart showing that a proximity sensor value, a gyroscope sensor value, and an acceleration sensor value according to an embodiment of the present invention become input values of a deep learning model when the values satisfy predetermined reference values.

According to an embodiment of the present invention, the operation sequence may include determining whether a proximity sensor value is a first reference value or less (S610) and determining whether a gyroscope sensor value is a second reference value or more or an acceleration sensor value is a third reference value or more (S620). Depending on embodiments of the present invention, steps S610 and 620 may be omitted or combined.

According to an embodiment of the present invention, the processor 180 can determine whether a proximity sensor value is a first reference value or less and determining whether a gyroscope sensor value is a second reference value or more or an acceleration sensor value is a third reference value or more.

In detail, when a proximity sensor value is a first reference value or less and a gyroscope sensor value is a second reference value or more or when a proximity sensor value is a first reference value or less and an acceleration sensor value is a third reference value or more, the processor 180 can input data acquired from the sensors to the deep learning model.

In more detail, in order to primarily determine whether a shock requiring self-diagnosis is generated, the processor 180 can determine whether a proximity sensor value is the first reference value or less. The first reference value may be a value set by a developer on the basis of experience.

In detail, when a shock requiring self-diagnosis is generated, the ground that the artificial intelligence apparatus 100 hits approaches. Accordingly, the processor 180 can primarily determine whether a shock requiring self-diagnosis has been generated when the proximity sensor value is the first reference value or less.

In this case, the first reference value may be the length of the artificial intelligence apparatus.

In detail, a proximity sensor value that is acquired when the artificial intelligence apparatus collides with the ground may be the same as or smaller than the length of the artificial intelligence apparatus 100.

In more detail, a proximity sensor value that is acquired when the artificial intelligence apparatus collides with the ground may be the same as the length of the artificial intelligence apparatus 100. For example, when a proximity sensor is mounted on the top of the artificial intelligence apparatus, the artificial intelligence apparatus drops in a vertical position, and the bottom of the artificial intelligence apparatus collides with the ground, the proximity sensor value may be the same as the length of the artificial intelligence apparatus 100.

Further, a proximity sensor value that is acquired when the artificial intelligence apparatus collides with the ground may be smaller than the length of the artificial intelligence apparatus 100. For example, when a proximity sensor is mounted on the top of the artificial intelligence apparatus, the artificial intelligence apparatus drops in an inclined position, and the bottom of the artificial intelligence apparatus collides with the ground, the proximity sensor value may be smaller than the length of the artificial intelligence apparatus 100. As another example, when a proximity sensor is mounted on the center portion of the artificial intelligence apparatus, the artificial intelligence apparatus drops in a vertical position, and the bottom of the artificial intelligence apparatus collides with the ground, the proximity sensor value may be smaller than the length of the artificial intelligence apparatus 100.

That is, when the artificial intelligence apparatus collides with the ground, the proximity sensor value has a value smaller than the length of the artificial intelligence apparatus 100. Accordingly, the processor 180 can primarily determine whether a shock requiring self-diagnosis has been generated when the proximity sensor value is the first reference value or less.

When the proximity sensor value is the first reference value or less, the processor 180 can determine whether the gyroscope sensor value is the second reference value or more or whether the acceleration sensor value is the third reference value or more.

The second reference value and the third reference value may be values set by a developer on the basis of experience.

In detail, it is inefficient that the processor 180 inputs data acquired in all cases when the proximity sensor value is the first reference value or less into the deep learning model, so the processor 180 can input data acquired when the gyroscope sensor value is the second reference value or more or the acceleration sensor value is the third reference value or more into the deep learning model.

In more detail, the processor 180 has to be able to discriminate the case when a user simply moves the artificial intelligence apparatus 100 (resultant value of deep learning model: 0) and a shock requiring self-diagnosis (resultant value: 1) from each other. Whether a shock requiring self-diagnosis is generated may include the following cases.

1) When the artificial intelligence apparatus 100 drops without rotation

2) When the artificial intelligence apparatus 100 drops with rotation

3) When a shock is generated due to the artificial intelligence apparatus 100 rotating without dropping Further, by inputting sensing values into the deep learning model when the proximity sensor value is the first reference value or less and the gyroscope sensor value is the second reference value or more, it is possible to primarily determine the cases 2) and 3).

In detail, when the rotational speed of the artificial intelligence apparatus is large even if the dropping speed of the artificial intelligence apparatus is not large (or even if the artificial intelligence apparatus does not drop), the artificial intelligence apparatus may be damaged by a shock due to rotation. Accordingly, when the proximity sensor value is the first reference value or less and the gyroscope sensor value is the second reference value or more, the processor 180 can progress to the next step (S530).

On the other hand, by inputting sensing values into the deep learning model when the proximity sensor value is the first reference value or less and the acceleration sensor value is the third reference value or more, it is possible to primarily determine the cases 1) and 2).

In detail, when the dropping speed of the artificial intelligence apparatus is large even if the rotational speed of the artificial intelligence apparatus is not large (or even if the artificial intelligence apparatus does not rotate), the artificial intelligence apparatus may be damaged by a shock due to dropping. Accordingly, when the proximity sensor value is the first reference value or less and the acceleration sensor value is the third reference value or more, the processor 180 can progress to the next step (S530).

In other words, the processor 180 can determine all of the cases when a shock is generated due to large acceleration and when a shock is generated due to a large rotational speed in accordance with the cases 1), 2), and 3).

When a shock requiring self-diagnosis is generated, the gyroscope sensor value has a value that is the second reference value or more or the acceleration sensor value has a value that is the third reference value or more.

Consequently, when the proximity sensor value is the first reference value or less and the gyroscope sensor value is the second reference value or more or when the proximity sensor value is the first reference value or less and the acceleration sensor value is the third reference value or more, the processor 180 can progress to the next step (S530).

Meanwhile, according to an embodiment of the present invention, the determining of whether the gyroscope sensor value is the second reference value or more or whether the acceleration sensor value is the third reference value or more (S620) may be omitted. Hereafter, it is described with reference to FIG. 7.

FIG. 7 is a diagram showing that a proximity sensor value according to an embodiment of the present invention becomes an input of a deep learning model when the proximity sensor value is a first reference value or less.

In order to primarily determine whether a shock requiring self-diagnosis is generated, the processor 180 can determine whether a proximity sensor value is the first reference value or less.

In detail, whether a shock requiring self-diagnosis is generated may include the following cases.

1) When the artificial intelligence apparatus 100 drops without rotation

2) When the artificial intelligence apparatus 100 drops with rotation

3) When a shock is generated due to the artificial intelligence apparatus 100 rotating without dropping According to an embodiment of the present invention, the case when the proximity sensor value is the first reference value or less may include all the following cases.

1) When the artificial intelligence apparatus 100 drops without rotation

2) When the artificial intelligence apparatus 100 drops with rotation

3) When a shock is generated due to the artificial intelligence apparatus 100 rotating without dropping In more detail, when a shock requiring self-diagnosis is generated, the proximity sensor value would have a value close to 0. Accordingly, when the proximity sensor value is the first reference value or less, the processor 180 can progress to the determining of whether it is a shock requiring self-diagnosis by inputting acquired data into the deep learning model (S530).

Meanwhile, according to an embodiment of the present invention, the determining of whether the proximity sensor value is the first reference value or less (S610) may be omitted. Hereafter, it is described with reference to FIG. 8.

FIG. 8 is a diagram showing that a gyroscope sensor value or an acceleration sensor value according to an embodiment of the present invention becomes an input of a deep learning model when the gyroscope sensor value is a second reference value or more or the acceleration sensor value is a third reference value or more. The processor 180 can primarily determine whether it is a shock requiring self-diagnosis by inputting data acquired then the gyroscope sensor value is the second reference value or more or the acceleration sensor value is the third reference value or more into the deep learning model.

In detail, whether a shock requiring self-diagnosis is generated may include the following cases.

1) When the artificial intelligence apparatus 100 drops without rotation

2) When the artificial intelligence apparatus 100 drops with rotation

3) When a shock is generated due to the artificial intelligence apparatus 100 rotating without dropping According to an embodiment of the present invention, the case when the gyroscope sensor value is the second reference value or more or the acceleration sensor value is the third reference value or more may include the following cases.

1) When the artificial intelligence apparatus 100 drops without rotation

2) When the artificial intelligence apparatus 100 drops with rotation

3) When a shock is generated due to the artificial intelligence apparatus 100 rotating without dropping When a shock is generated, the processor 180 can determine whether the gyroscope sensor value is the second reference value or more or whether the acceleration sensor value is the third reference value or more.

That is, the processor 180 can progress to the determining of whether it is a shock requiring self-diagnosis (S530) by inputting data acquired then the gyroscope sensor value is the second reference value or more or the acceleration sensor value is the third reference value or more into the deep learning model.

Next, the process of FIG. 5 is described. When a datum acquired through the sensing unit 140 satisfy a predetermined reference value, the processor 180 determines whether it is a shock requiring self-diagnosis by inputting the datum into the deep learning model.

In detail, the input values that are input to the deep learning model may include an acceleration sensor value and a gyroscope sensor value acquired through the sensing unit 140. The deep learning model of the present invention is described hereafter in more detail with FIG. 9.

Figure 9:
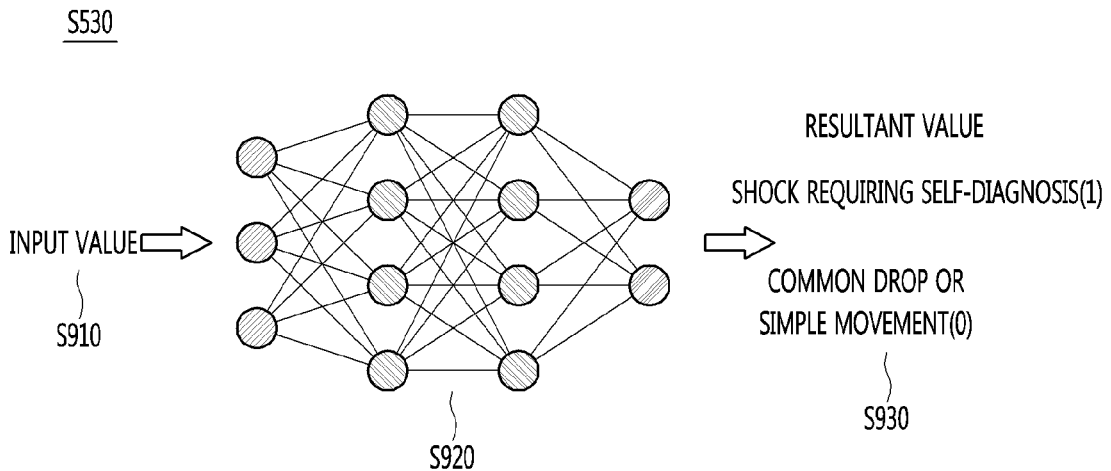
FIG. 9 is a diagram showing that a shock requiring self-diagnosis and a common drop or a simple movement are resultant values when an input value is input in a deep learning model according to an embodiment of the present invention.

FIG. 9 is a diagram showing that an input value is input to the deep learning model according to an embodiment of the present invention (S910), a shock requiring self-diagnosis (resultant value of deep learning model: 1) and a common drop or a simple movement (resultant value of deep learning model: 0) are used as resultant values (S930).

According to an embodiment of the present invention, the deep learning model may include a neural network of which the weight is adjusted by being trained using whether it is a shock requiring self-diagnosis as a resultant value (S930) and sensing values of the gyroscope sensor and the acceleration sensor as input values.

In detail, the deep learning model may be a model that determines whether a shock requiring self-diagnosis is generated using only a sensor value and the gyroscope sensor value. That is, it is possible to reduce the calculation load in the process of training and using the deep learning model.

In more detail, the processor 180 can acquire output values that the deep learning model outputs by inputting data acquired from the gyroscope sensor and the acceleration sensor.

The deep learning model may be a neural network of which the weight is adjusted by being trained using whether it is a shock requiring self-diagnosis as a resultant value and the sensing values of the gyroscope sensor and the acceleration sensor as input values.

In more detail, according to an embodiment of the present invention, data acquired from the gyroscope sensor and the acceleration sensor may be shown in a vector type in training data of the deep learning model.

In this case, the deep learning model can configure training data and a label (whether it is a shock requiring self-diagnosis) corresponding to the training data as one training set in accordance with each resultant value, and the training set can be input to the deep learning model.

As a method of collecting training sets of the deep learning model, it is possible to use data stored in a server or a cloud and it may be use information stored in an internal memory of the artificial intelligence apparatus 100.

The deep learning model infers a function about the relationship between the training data (a gyroscope sensor value and an acceleration sensor value) and the labeled data (whether it is a shock requiring self-diagnosis) and evaluates the inferred function, whereby the weight of the deep learning mode and parameters can be determined (optimized).

According to an embodiment of the present invention, the deep learning model may include a neural network of which the weight is adjusted by being trained using whether it is a shock requiring self-diagnosis as a resultant value (S930) and further using a proximity sensor value to the gyroscope sensor value and the acceleration sensor value as an input value.

In detail, the deep learning model may be a model that determines whether a shock requiring self-diagnosis is generated using a sensor value, the gyroscope sensor value, and the proximity sensor value. That is, it is possible to increase the accuracy of the deep learning model when determining whether it is a shock requiring self-diagnosis.

In more detail, the processor 180 can acquire output values that the deep learning model outputs by inputting data acquired from the gyroscope sensor, the acceleration sensor, and the proximity sensor.

The deep learning model may be a neural network of which the weight is adjusted by being trained using whether it is a shock requiring self-diagnosis as a resultant value and the sensing values of the gyroscope sensor, the acceleration sensor, and the proximity sensor as input values.

In more detail, according to an embodiment of the present invention, data acquired from the gyroscope sensor, the acceleration sensor, and the proximity sensor may be shown in a vector type in training data of the deep learning model.

In this case, the deep learning model can configure training data and a label (whether it is a shock requiring self-diagnosis) corresponding to the training data as one training set in accordance with each resultant value, and the training set can be input to the deep learning model.

As a method of collecting training sets of the deep learning model, it is possible to use data stored in a server or a cloud and it may be use information stored in an internal memory of the artificial intelligence apparatus 100.

The deep learning model infers a function about the relationship between the training data (a gyroscope sensor value, an acceleration sensor value, and a proximity sensor value) and the labeled data (whether it is a shock requiring self-diagnosis) and evaluates the inferred function, whereby the weight of the deep learning mode and parameters can be determined (optimized).

Next, self-diagnosis priority setting (S540) of FIG. 5 is described.

When determining that it is a shock requiring self-diagnosis (resultant value of deep learning model: 1) on the basis of the output from the deep learning model using data acquired when the shock is generated as input values of the deep learning model, the processor 180 sets a self-diagnosis priority of the parts in the artificial intelligence apparatus 100 (S340). The method of setting a self-diagnosis priority of the present invention in FIG. 9 is described in detail.

Figure 10:
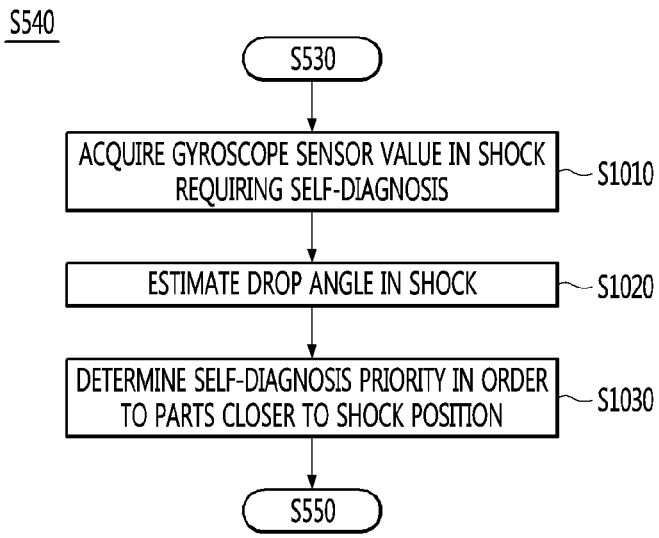
FIG. 10 is a flowchart showing setting a self-diagnosis priority when a resultant value of a deep learning model according to an embodiment of the present invention is a shock requiring self-diagnosis.

FIG. 10 is a flowchart showing setting a self-diagnosis priority when a resultant value of a deep learning model according to an embodiment of the present invention is a shock 1 requiring self-diagnosis.

According to an embodiment of the present invention, when an output value that is output from the deep learning mode shows a shock requiring self-diagnosis, the processor can estimate the drop angle in the shock using the gyroscope sensor value and can perform self-diagnosis sequentially in order of parts having higher priorities in accordance with the estimated angle.

In detail, the processor 180 acquires a gyroscope sensor value when a shock requiring self-diagnosis is generated (S1010). The case when a shock requiring self-diagnosis is generated may include the case when the proximity sensor value is 0.

The processor 180 estimated a drop angle in a shock using a gyroscope sensor value when the shock is generated (S1020). In detail, since the gyroscope sensor measures an angular speed, the angular speed is 0 when the artificial intelligence apparatus 100 is stopped, and an angular speed is generated when there is a specific motion. The processor 180 may estimate an angle by integrating angular speed information that is a value acquired from the gyroscope sensor value in order to estimate an angle when a shock requiring self-diagnosis is generated.

Thereafter, the processor 180 acquires the shock position using the shock angle and the self-diagnosis priority is set in order of parts closer to the shock position in the artificial intelligence apparatus (S1030).

According to an embodiment of the present invention, the priority may set from a part closer to the shock position.

In this process, the processor 180 can also estimate the droop angle in the shock using a gyroscope sensor value and an acceleration sensor value when a shock requiring self-diagnosis is generated. Further, it may be possible to use a predetermined mapping table in which a self-diagnosis priority has been mapped, using the priority and the drop angle in a shock as parameters.

Next, self-diagnosis performing (S550) of FIG. 5 is described.

When a self-diagnosis priority is set, the processor 180 performs self-diagnosis on corresponding parts in accordance with the priority (S550). Self-diagnosis may be to determine whether a corresponding part normally operates and whether repair is required due to a defect.

After performing self-diagnosis, the processor 180 transmits a control signal for outputting a self-diagnosis result by controlling the output unit 150 to the output unit 150. The output unit 150 can output data using the control signal acquired from the processor 180 (S560). An output method is described hereafter in detail with FIG. 11.

Figure 11:
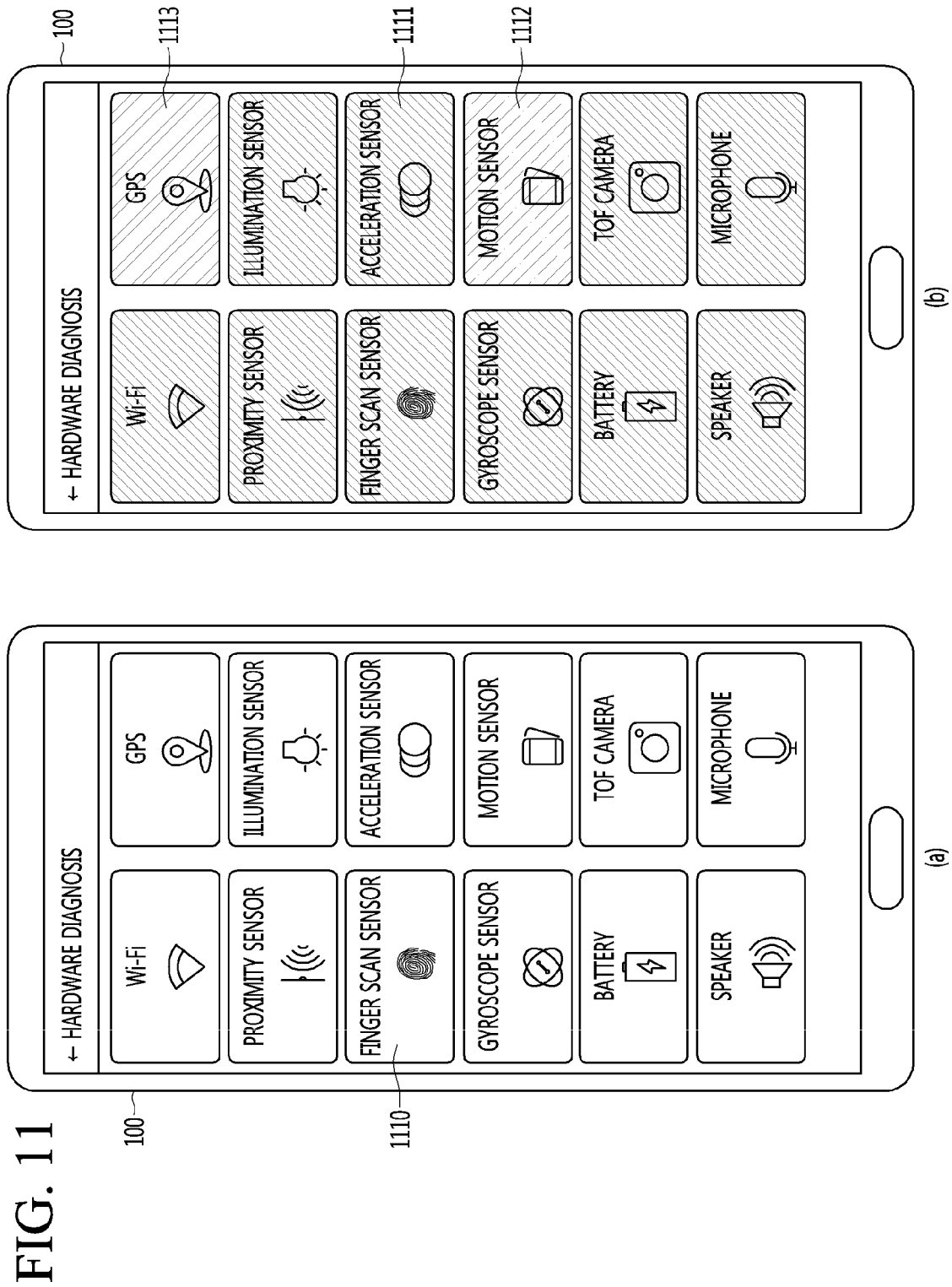
FIG. 11 is a diagram showing that a notice is displayed in accordance with self-diagnosis in accordance with an embodiment of the present invention.

FIG. 11 is a diagram showing that a notice is displayed in accordance with self-diagnosis in accordance with an embodiment of the present invention. When determining that it is a shock requiring self-diagnosis, the processor 180 can perform self-diagnosis on the parts in the artificial intelligence apparatus and can control the output unit 150 to output a self-diagnosis result.

According to an embodiment of the present invention, when the self-diagnosis result is abnormality or a warning, the processor can provide abnormality diagnosis information of the corresponding part to a service center.

In detail, the output unit 150 outputs the self-diagnosis result transmitted from the processor. As a detailed display method, it may be possible to include three steps of normality, abnormality, and warning, depending on the states of parts as the self-diagnosis result. The processor 180 can make the output unit output different colors in accordance with the steps of normality, abnormality, and warning. For example, the processor can control the output unit 150 to output green when a corresponding part is normal (1111), yellow when it is abnormal (1113), and red when it is a warning (1112).

Next, FIG. 5 is described.

After controlling the output unit 150 to output the self-diagnosis result, the processor 180 can provide abnormality diagnosis information of the corresponding part to a service center when the self-diagnosis result is abnormality or warning (S570). Hereafter, FIG. 12 is referred to in detail.

Figure 12:
FIG. 12 is a diagram showing that abnormality diagnosis information of a corresponding part is provided to a service center when a self-diagnosis result is abnormal or warning in accordance with an embodiment of the present invention.

FIG. 12 is a diagram showing that abnormality diagnosis information of a corresponding part is provided to a service center when a self-diagnosis result is abnormal or warning in accordance with an embodiment of the present invention. The processor 180 can transmit the states of the parts in the artificial intelligence apparatus of a user by providing the self-diagnosis result to a service center.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

Further, the computer may include the processor 180 of an artificial intelligence apparatus.

What is claimed is:

1. An artificial intelligence apparatus comprising:
a sensing unit that includes a gyroscope sensor and an acceleration sensor;
an output unit that outputs information; and
a processor that acquires a resultant value output from a deep learning model by inputting data acquired from the gyroscope sensor and the acceleration sensor into the deep learning model, performs self-diagnosis when the resultant value shows a shock requiring self-diagnosis, and controls the output unit to output a result of the self diagnosis,
wherein the deep learning model is a neural network having an adjusted weight by training sensing values of the gyroscope sensor and the acceleration sensor as input values to output the resultant value,
wherein the deep learning model outputs the resultant value that shows whether a shock is a shock requiring self-diagnosis or a simple shock using data acquired from the sensing unit,
wherein the sensing unit further includes a proximity sensor, and
wherein when a value of the proximity sensor is a first reference value or less and a gyroscope sensor value is a second reference value or more, or when the value of the proximity sensor is the first reference value or less and an acceleration sensor value is a third reference value or more,
the processor inputs data acquired from the gyroscope sensor, the acceleration sensor, and the proximity sensor into the deep learning model.

2. The artificial intelligence apparatus of claim 1, wherein when the resultant value output by the deep learning model shows that a shock requiring diagnosis, the processor estimates a drop angle in a collision using the gyroscope sensor value and performs self-diagnosis on parts in high priority order in accordance with the drop angle.

3. The artificial intelligence apparatus of claim 2, wherein the high priority order is an order of parts closer to a collision point in a collision.

4. The artificial intelligence apparatus of claim 1, wherein when the self-diagnosis result is abnormality or warning, the processor provides abnormality diagnosis information of a corresponding part to a service center.

5. An artificial intelligence apparatus comprising:
a sensing unit that includes a gyroscope sensor and an acceleration sensor;
an output unit that outputs information; and
a processor that acquires a resultant value output from a deep learning model by inputting data acquired from the gyroscope sensor and the acceleration sensor into the deep learning model, performs self-diagnosis when the resultant value shows a shock requiring self-diagnosis, and controls the output unit to output a result of the self diagnosis,
wherein the deep learning model is a neural network having an adjusted weight by training sensing values of the gyroscope sensor and the acceleration sensor as input values to output the resultant value,
wherein the deep learning model outputs the resultant value that shows whether a shock is a shock requiring self-diagnosis or a simple shock using data acquired from the sensing unit,
wherein the sensing unit further includes a proximity sensor, and
wherein when a value of the proximity sensor is a first reference value or less and a gyroscope sensor value is a second reference value or more, or when the value of the proximity sensor is the first reference value or less and an acceleration sensor value is a third reference value or more,
the processor inputs data acquired from the gyroscope sensor and the acceleration sensor into the deep learning model.

6. A self-diagnosis method comprising:
acquiring data from a gyroscope sensor and an acceleration sensor by means of a sensing unit;
determining the data acquired through the sensing unit satisfy a predetermined reference value by means of a processor;
inputting the data acquired through the sensing unit into a deep learning model by means of the processor when the data satisfy the predetermined reference value;
performing self-diagnosis by means of the processor when a resultant value of the deep learning model shows a shock requiring self-diagnosis; and
outputting a result of the self-diagnosis by means of an output unit,
wherein the deep learning model is a neural network having an adjusted weight by training sensing values of the gyroscope sensor and the acceleration sensor as input values to output the resultant value,
wherein the deep learning model outputs the resultant value that shows whether a shock is a shock requiring self-diagnosis or a simple shock using data acquired from the sensing unit,
wherein the sensing unit further includes a proximity sensor, and
wherein when a value of the proximity sensor is a first reference value or less and a gyroscope sensor value is a second reference value or more, or when the value of the proximity sensor is the first reference value or less and an acceleration sensor value is a third reference value or more,
the processor inputs data acquired from the gyroscope sensor, the acceleration sensor, and the proximity sensor into the deep learning model.

7. A non-transitory computer-readable medium in which a program for performing a self-diagnosis method is recorded, the self-diagnosis method comprising:
acquiring data from a gyroscope sensor and an acceleration sensor by a sensing unit;
determining the data acquired through the sensing unit satisfy a predetermined reference value by a processor;
inputting the data acquired through the sensing unit into a deep learning model by the processor when the data satisfy the predetermined reference value;
performing self-diagnosis by the processor when a resultant value of the deep learning model shows a shock requiring self-diagnosis; and
outputting a result of the self-diagnosis by an output unit,
wherein the deep learning model is a neural network having an adjusted weight by training sensing values of the gyroscope sensor and the acceleration sensor as input values to output the resultant value,
wherein the deep learning model outputs the resultant value that shows whether a shock is a shock requiring self-diagnosis or a simple shock using data acquired from the sensing unit,
wherein the sensing unit further includes a proximity sensor, and wherein when a value of the proximity sensor is a first reference value or less and a gyroscope sensor value is a second reference value or more, or when the value of the proximity sensor is the first reference value or less and an acceleration sensor value is a third reference value or more, the processor inputs data acquired from the gyroscope sensor, the acceleration sensor, and the proximity sensor into the deep learning model.

* * * * *